United States Patent
Cheon (10) Patent No.: US 8,509,849 B2
(45) Date of Patent: Aug. 13, 2013

(54) APPARATUS AND METHOD FOR DISPLAYING OPERATING STATE OF MULTI-STANDBY TERMINAL

(75) Inventor: Jeong Nam Cheon, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 665 days.

(21) Appl. No.: 12/723,872

(22) Filed: Mar. 15, 2010

(65) Prior Publication Data

US 2010/0248782 A1  Sep. 30, 2010

(30) Foreign Application Priority Data

Mar. 27, 2009  (KR) .................. 10-2009-0026289

(51) Int. Cl.
  *H04B 1/38* (2006.01)
(52) U.S. Cl.
  CPC .................................. *H04B 1/3816* (2013.01)
  USPC .......................................... 455/558; 455/566
(58) Field of Classification Search
  CPC .................................................... H04B 1/3816
  USPC ................ 455/550.1, 551, 552.1, 553.1, 558, 455/566, 567, 575.1, 90.3, 347, 351
  See application file for complete search history.

(56) References Cited

U.S. PATENT DOCUMENTS

2008/0064443 A1 * 3/2008 Shin et al. ..................... 455/558
2009/0029736 A1 * 1/2009 Kim et al. ..................... 455/558

FOREIGN PATENT DOCUMENTS

| EP | 0973347 | 4/2002 |
|---|---|---|
| JP | 3042619 | 3/2000 |
| JP | 3071509 | 6/2000 |
| JP | 3108814 | 3/2005 |

* cited by examiner

*Primary Examiner* — Thanh Le
(74) *Attorney, Agent, or Firm* — Cha & Reiter, LLC (57) ABSTRACT

A method of displaying an operating state of a multi-standby terminal including a first subscriber identification module (SIM) and a second subscriber identification module (SIM) and an apparatus for providing same are provided. The method preferably includes: checking whether the first SIM and the second SIM were installed; and emitting light of a first light emitter when the first SIM is installed, and emitting light of a second light emitter when the second SIM is installed.

20 Claims, 5 Drawing Sheets

APPARATUS AND METHOD FOR DISPLAYING OPERATING STATE OF MULTI-STANDBY TERMINAL

CLAIM OF PRIORITY

This application claims the benefit of priority under 35 U.S.C. §119 (a) from a Korean patent application filed in the Korean Intellectual Property Office on Mar. 27, 2009 and assigned Serial No. 10-2009-0026289, which is hereby incorporated by reference in its entirety.

BACKGROUND OF THE INVENTION

1. Field of the Invention

The present invention relates to a method and apparatus for displaying operating states of a portable terminal. More particularly, the present invention relates to a method and apparatus for displaying an operating state of a multi-standby terminal.

2. Description of the Related Art

Portable terminals are now widely used due to the development of associated mobile communication technologies. Moreover, recent portable terminals have optionally included various functions such as an MP3 function, a mobile broadcast receiving function, a video-play function and a camera function or the like. Recently there is a multi-standby terminal under development, in which a simultaneous call standby with two or more wireless communication networks is possible. For example, the multi-standby terminal allows for a simultaneous call standby with a wireless communication network of CDMA (Code Division Multiple Access) type and a wireless communication network of GSM (Global System for Mobile communication) type. To operate simultaneous call standby with these two protocols, the multi-standby terminal requires two or more subscriber identification modules (SIMs), for example, a SIM for CDMA and a SIM for GSM, respectively. However, the SIM is installed in the inside of the terminal, so that it is difficult for the user to recognize whether or not there are SIMs installed for respective protocols. In addition, in the case of multiple SIMs, a user can set one of the SIMs as master to be used first when sending a call or a message. However, the user may not always remember a SIM which is set as master, as these types of technical details are often not fully understood or appreciated by users. However, according to a current multi-standby terminal, the user cannot intuitively recognize whether or not a SIM or SIMS are installed, and the particular master/slave setting state of the SIM.

SUMMARY OF THE INVENTION

The present invention provides a method and apparatus for displaying the operating state of a multi-standby terminal, whereby a user can intuitively recognize whether or not a subscriber identification module (SIM) is installed, and if a master/slave setting state of a subscriber identification module has been set, and to recognize that a subscriber identification module linked with generation of an event.

In accordance with an exemplary aspect of the present invention, an apparatus for displaying the operating state of a multi-standby terminal preferably includes a first subscriber identification module (SIM) and a second subscriber identification module (SIM) includes: a first light emitter which is mounted for emission outside of the multi-standby terminal; a second light emitter which is separated from the first light emitter at a specific interval and is mounted for emission outside of the multi-standby terminal; a power supply unit which supplies power to the first light emitter and the second light emitter; and a first controller that controls the power supply unit to emit light from the first light emitter when the first SIM is installed and to emit light from the second light emitter when the second SIM is installed.

In accordance with another exemplary aspect of the present invention, a method of displaying the operating state of a multi-standby terminal including a first subscriber identification module (SIM) and a second subscriber identification module (SIM) includes: checking whether or not the first SIM and the second SIM are installed; and emitting light of a first light emitter when the first SIM is installed, and emitting light of a second light emitter when the second SIM is installed.

BRIEF DESCRIPTION OF THE DRAWINGS

The above and other exemplary aspects, features, and advantages of certain exemplary embodiments of the present invention will become more apparent from the following description taken in conjunction with the accompanying drawings, in which.

DETAILED DESCRIPTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring appreciation of the subject matter of the present invention by a person of ordinary skill in the art.

In the meantime, a person of ordinary in the art should understand and appreciate that the following disclosure is provided for exemplary purposes only and is not intended as a limitation of the present invention. Furthermore, all alternate embodiments which are obvious modifications of this disclosure are intended to be encompassed within the scope of the presently claimed invention.

Hereinafter, a "subscriber identification module" (SIM) refers to an apparatus which stores user authentication information to use a specific wireless communication network. Such a subscriber identification module may comprise a SIM (Subscriber Identification Module), a USIM (Universal Subscriber Identification Module), and a UIM (User Identification Module), just to name a few possible types of identification modules.

Hereinafter, "master" refers to a subscriber identification module which is set to be used first among a plurality of subscriber identification modules in case user requests transmitting a call or sending a text message.

Hereinafter, "slave" refers to a subscriber identification module which is not set as the master among a plurality of subscriber identification modules.

Hereinafter, a dual-standby terminal, in which a call standby with two same or different wireless communication networks at the same time is possible, is used as an example of a multi-standby terminal according to an exemplary embodiment of the present invention for the convenience of illustration.

Figure 1:
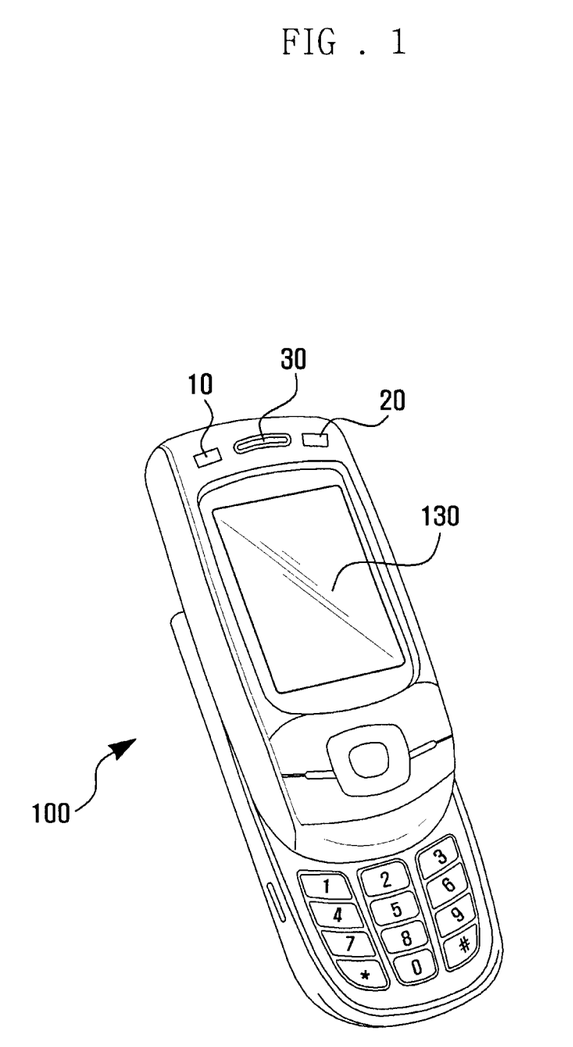
FIG. 1 is a perspective view of a multi-standby terminal according to an exemplary embodiment of the present invention.

FIG. 1 is a perspective of a multi-standby terminal according to an exemplary embodiment of the present invention.

Referring now to FIG. 1, a multi-standby terminal 100 according to this exemplary embodiment of the present invention is a slide-type terminal, and can include a first subscriber identification module (SIM) and a second subscriber identification module. However, other types of multi-standby terminals are applicable within the spirit and scope of the claimed invention. Particularly, the multi-standby terminal 100 according to the present invention preferably includes a first light emitter 10 and a second light emitter 20 on an upper side (e.g., beside a speaker 30) of the upper body where a display unit 130 is mounted.

Preferably, the first light emitter 10 can be linked with the first subscriber identification module and can be operated, and the second light emitter 20 can be linked with the second subscriber identification module and can be operated. Hereinafter, both the first light emitter 10 and the second light emitter 20 can be referred to as a light emitter(s) depending on the situation.

The light emitter is used to intuitively inform a user of an operating state of the multi-standby terminal 100. For example, the user can be informed intuitively whether or not: (1) a subscriber identification module (SIM) is installed and is operating normally; (2) a master/slave setting state of a SIM; and (3) a SIM related with generation of an event among a plurality of SIMs, and is mounted for emission to the exterior of the terminal 100. A light emitting diode (LED) is preferably used as a light emitter, but other types of light emitting technology can be applied with the presently claimed invention. Moreover, in case where a master/slave setting state of the SIM is distinguished by the emitting light color of the light emitter, the light emitter preferably comprises a color LED (e.g., a seven-color LED but fewer or more colors can be used) which can emit a light of two or more colors. In addition, in case the light emitter is a single color LED, the master/slave setting state of the SIM can be distinguished by the brightness of the light emitter. Also, if there is an error or malfunction of a particular SIM, the light emitter may also display a certain color, or flash, or change their level of brightness, just to name a few possibilities.

The multi-standby terminal 100 can activate (ON) the first light emitter 10 when the first SIM is installed, and activate (ON) the second light emitter 20 when the second SIM is installed, through which user can intuitively recognize whether or not the first SIM or the second SIM is installed.

More particularly, in order to distinguish master/slave setting state of the SIM by brightness of the light emitter, the multi-standby terminal 100 can emit light of the first light emitter 10, with first brightness, for example, the maximum brightness of the first light emitter 10, that is, 100% brightness, in case the first SIM is set as master, and can emit light of the second light emitter 20 with second brightness which is relatively darker than the first brightness, for example, 40% brightness of the maximum brightness. Thereafter, in case user changes the second SIM to master, the multi-standby terminal 100 can emit light of the first light emitter 10 with the second brightness (40%), and can emit light of the second light emitter 20 with the first brightness (100%), through which user can intuitively recognize master/slave setting state of the SIM. Further, while the above explanation utilizes a first brightness being the maximum brightness (100%) of the light emitter, a person of ordinary skill in the art should understand and appreciate that the presently claimed invention is not limited to the above example. That is, the first brightness can be set as brightness which is darker than the maximum brightness (for example, 80% of the maximum brightness) in consideration of power consumption. Likewise, the second brightness can also be set as different brightness according to designer's intention. A person of ordinary skill in the art should also understand and appreciate that the above percentages are not limiting to the claimed invention, and just provided for illustrative purposes.

In addition, in order to distinguish master/slave setting state of the SIM by emitting different colored light by the light emitter, the multi-standby terminal 100 can control the first light emitter 10 to emit light of a preset first color (e.g., green) in case the first SIM is set as master, and can make the second light emitter 20 emit light of a second color (e.g., red) that can be easily visually distinguished from the first color. Thereafter, in case the second SIM is changed as master, the multi-standby terminal 100 can control the first light emitter 10 emit light of the second color (red), and can control the second light emitter emit light of the first color (green).

In addition, the multi-standby terminal 100 can control the first light emitter 10 to flicker when an event related with the first SIM occurs, and can control the second light emitter 20 to flicker when an event related with the second SIM occurs, through which user can intuitively recognize a SIM related with a currently occurring event.

Further, FIG. 1 does not limit the mounting position of the claimed invention to the position of first light emitter 10 and the second light emitter 20 shown in the drawing. That is, the first light emitter 10 and the second light emitter 20 can be mounted in various positions. In addition, it is preferably for the first light emitter 10 and the second light emitter 20 to be positioned in a place where the first light emitter 10 and the second light emitter 20 can be easily seen by the user. In addition, the multi-standby terminal 100 according to the present invention is not limited to a slide type. That is, the multi-standby terminal 100 according to the present invention can be formed in various types such as a folder type and a bar type or the like, just to name some possible constructions of portable multi-standby terminals.

Until now, an external appearance of a multi-standby terminal 100 according to an exemplary embodiment of the present invention was schematically explained. Hereinafter, the configuration of each element of a multi-standby terminal 100 will be explained in detail with reference to FIG. 2.

Figure 2:
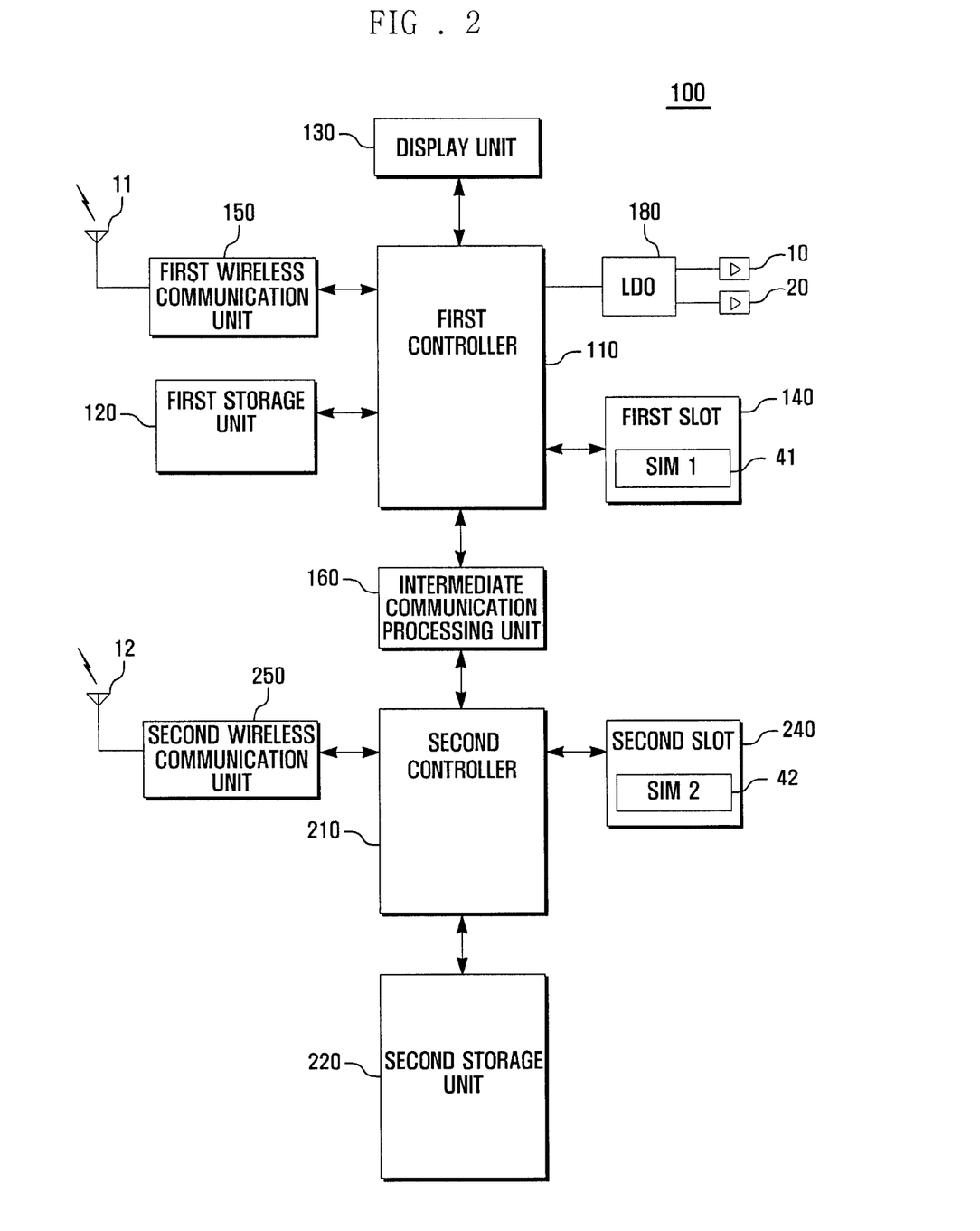
FIG. 2 is a block diagram illustrating a schematic configuration of a multi-standby terminal according to an exemplary embodiment of the present invention.

FIG. 2 is a block diagram illustrating a schematic configuration of a multi-standby terminal according to an exemplary embodiment of the present invention.

Referring now to FIG. 2, the multi-standby terminal 100 preferably includes a first wireless communication unit 150, a second wireless communication unit 250, a display unit 130, a first storage unit 120, a second storage unit 220, a first slot 140, a second slot 240, a first controller 110, a second controller 210, a power supply unit 180, a first light emitter 10, a second light emitter 20 and an intermediate communication processing unit 160. The person of ordinary skill in the art should understand and appreciate that some of the items shown can be combined, for example a common storage unit.

The first slot 140 is a device into which a first SIM (SIM1) 41 is inserted, and the first slot 140 operates as an interface unit which connects the first SIM 41 with the first controller 110. The first SIM 41 is a device where user authentication information for using a first wireless communication network is stored.

The second slot 240 is a device into which a second SIM (SIM2) 42 is inserted, and the second slot 240 operates as an interface unit which connects the second SIM 42 with the second controller 210. The second SIM 42 is a device where user authentication information for using a second wireless communication network is stored.

The first wireless communication unit 150 can transmit wireless signals to a first wireless communication network which provides a communication service in a first wireless communication method (e.g., CDMA, GSM and WCDMA or the like), and can receive wireless signals from the first wireless communication network. To this end, the first wireless communication unit 150 can modulate and frequency-up-convert a signal output from the first controller 110, and transmit the modulated and converted signal through a first antenna 11, or can frequency-down-convert and demodulate a wireless signal received through the first antenna 11, and transmit the converted and demodulated signal to the first controller 110. For example, the first wireless communication unit 150 can transmit and receive a call request and a text message through the first wireless communication network, and can receive contents data according to user's request.

The second wireless communication unit 250 can transmit wireless signals to a second wireless communication network which provides a communication service in a second wireless communication method (e.g., GSM, CDMA and WCDMA or the like), and can receive wireless signals from the second wireless communication network. Such a second wireless communication unit 250 can modulate and frequency-up-convert a signal output from the second controller 210, and transmit the modulated and converted signal through a second antenna 12, or can frequency-down-convert and demodulate a wireless signal received through the second antenna 12, and transmit the converted and demodulated signal to the second controller 210. That is, the second wireless communication unit 250 can transmit and receive a call request and a text message through the second wireless communication network, and can receive contents data according to user's request.

Further, FIG. 2 illustrates that the first wireless communication unit 150 and the second wireless communication unit 250 have a separate antenna, respectively, but the present invention is not limited to this example. That is, the first wireless communication unit 150 and the second communication unit 250 can use one antenna. In such a case, it is desirable for the multi-standby terminal 100 to include a means (e.g., a diplexer) for separating frequency bands of the first wireless communication unit 150 and the second wireless communication unit 250.

The power supply unit 180 comprises a device for supplying power to the first light emitter 10 and the second light emitter 20, and preferably comprises a Low Drop Output (LDO) as marked in FIG. 2. Such a power supply unit 180 preferably provides power to the first light emitter 10 and the second light emitter 20 under the control of the first controller 110. The power supply unit 180 will be explained later with reference to FIGS. 3A and 3B.

The first light emitter 10 is a device which emits light when power is supplied. The first light emitter 10 according to an exemplary embodiment of the present invention may comprise a light emitting diode (LED). Particularly, in case master/slave setting state of a SIM is distinguished by emitting light color of a light emitter, the first light emitter 10 can be a color LED which emits light of two or more colors. The first light emitter 10 can be linked with a first SIM and can be operated. In more detail, the first light emitter 10 can be activated (ON) in case the first SIM 41 is installed in a first slot 140, and can be deactivated (OFF) in case the first SIM 41 is not installed in the first slot 140. That is, a user can intuitively recognize whether a first SIM 41 is installed according to the activated or deactivated state of the first light emitter 10.

In addition, in case the first wireless communication unit 150 transmits and receives a call request, a text message and data, that is, an event related with the first SIM 41 occurs, the first light emitter 10 can flicker for a preset amount of time according to a preset flickering cycle, through which user can intuitively recognize that currently a call request, transmission and reception of a text message and data are being performed through the first wireless communication unit 150.

In addition, in case master/slave setting state of a SIM may also be distinguished by emitting light color of a light emitter, the first light emitter 10 can emit light of preset color (e.g., green in case of master, and red in case of slave) according to master or slave setting state of the first SIM 41. In case master/slave setting state of a SIM is distinguished by brightness of a light emitter, the first light emitter 10 can emit light with preset brightness according to master or slave setting state of the first SIM 41. For example, the first light emitter 10 can emit light with a first predetermined brightness (e.g. 100%) in case the first SIM 41 is set as master, and can emit light a the second brightness (e.g. 40%) in case the first SIM 41 is set as slave. That is, user can intuitively recognize master/slave setting state of the first SIM through emitting light color or brightness of the first light emitter 10.

The second light emitter 20 preferably comprises a device which emits light when power is supplied. The second light emitter 20 according to an exemplary embodiment of the present invention can be a light emitting diode (LED). Particularly, in case master/slave setting state of a SIM is distinguished by emitting light color of a light emitter, the second light emitter 20 can be a color LED which emits light of two or more colors. The second light emitter 20 can be linked with a second SIM 42, and can be operated. In more detail, the second light emitter 20 can be activated (ON) in case the second SIM 42 is installed in a second slot 240, and can be deactivated in case the second SIM 42 is not installed in the second slot 240. That is, user can intuitively recognize whether the second SIM 42 is installed by checking activated/deactivated state of the second light emitter 20.

In addition, in case the second wireless communication unit 250 transmits and receives a call request, a text message or data, that is, an event linked with the second SIM occurs, the second light emitter 20 can flicker for a preset amount of time according to a preset flickering cycle, through which user can intuitively recognize that currently a call request, a transmission and/or a reception of a text message and data are being performed through the second wireless communication unit 250.

In addition, in case master/slave setting state of a SIM is distinguished by emitting light color of a light emitter, the second light emitter 20 can emit light of preset color (e.g., green in case of master, and red in case of slave) according to master or slave setting state of the second SIM 42. In addition, in case master/slave setting state of an SIM is distinguished by brightness of a light emitter, the second light emitter 20 can emit light with preset/predetermined brightness (e.g., 100% brightness in case of master, and 40% brightness in case of slave) according to master or slave setting state of the second SIM 42. That is, user can intuitively recognize master/slave setting state of the second SIM 42 through emitting light color or brightness of the second light emitter 20.

The first storage unit 120 can store a general operating state of the multi-standby terminal 100, and a program which is necessary to communicate with the first wireless communication network, and data generated during execution of the program. For example, the first storage unit 120 can store an operating system which boots the multi-standby terminal 100, an application program which is necessary to operate a function of the multi-standby terminal 100 and data which is generated as the multi-standby terminal 100 is used. Particularly, the first storage unit 120 according to an exemplary embodiment of the present invention can store an operating scenario of the first light emitter 10 and the second light emitter 20 as shown in Table 1.

TABLE 1

|  |  | First light emitter | Second light emitter |
|---|---|---|---|
| Installation | SIM 1 | ON | OFF |
|  | SIM 2 | OFF | ON |
| Transmission/ | SIM 1 | Flicker | ON |
| Reception of call | SIM 2 | ON | Flicker |
| Transmission/ | SIM 1 | Flicker | ON |
| reception of text message | SIM 2 | ON | Flicker |
| Transmission/ | SIM 1 | Flicker | ON |
| reception of data | SIM 2 | ON | Flicker |
| Charger insertion |  | Flicker | Flicker |

Referring now to Table 1, the multi-standby terminal 100 according to the present invention can activate (ON) the first light emitter 10 when the first SIM 41 is installed, and can activate (ON) the second light emitter 20 when the second SIM 42 is installed. In addition, when an event (a call and transmission and reception of a text message or data) related with the first SIM 41 occurs, the multi-standby terminal 100 can flicker the first light emitter 10, and can maintain activated (ON) state of the second light emitter 20 or deactivate the second light emitter 20 until the event is terminated. In addition, when an event (a call and/or transmission and/or reception of a text message or data) related with the second SIM 42 occurs, the multi-standby terminal 100 can flicker the second light emitter 20, and can maintain activated (ON) state of the first light emitter 10 or deactivate (OFF) the first light emitter 10 until the event is terminated.

In addition, Table 1 provides one possible example according to an exemplary embodiment of the present invention, but the presently claimed invention is not limited to this example. In addition, the first storage unit 120 can store emitting light color or brightness of a light emitter for distinguishing master/slave setting. In addition, the first storage unit 120 can store a flickering cycle of the first light emitter 10 and the second light emitter 20. The flickering cycle of the first light emitter 10 and the second light emitter 20 can be differently set according to an event (e.g., a call request, transmission and reception of a text message and data, and battery charge).

The first storage unit 120 may store a menu program which sets whether the operating state of the multi-standby terminal 100 will be displayed through the first light emitter 10 and the second light emitter 20 in conjunction with a menu program which sets emitting light color of a light emitter according to master or slave setting.

The second storage unit 220 may store a program which is necessary to perform communication with the second wireless communication network, and data generated while the program is executed. That is, the second storage unit 220 can store a text message and contents data or the like received through the second wireless communication network 250.

Further, FIG. 2 illustrates the first storage unit 120 and the second storage unit 220 as separate elements, but the present invention is not limited to this example. That is, the first storage unit 120 and the second storage unit 220 can be formed, for example, in the form of one memory with two divided areas.

The display unit 130 can display various menu screens of the multi-standby terminal 100, user data inputted by user, function setting information and various information provided to user or the like. Such a display unit 130 can be formed as a liquid crystal display (LCD) and an organic light-emitting diode (OLED) or the like. In addition, any type of thin-film technology for the display screen is compatible with the claimed invention. In case the display unit 130 is formed as a touch screen, the display unit 130 can also operate as an input unit.

The display unit 130 can display an icon for displaying the operating state of the multi-standby terminal 100, for example, an icon corresponding to the first SIM 41 and the second SIM 42, in one side. Particularly, the display unit 130 according to an exemplary embodiment of the present invention can display a menu screen which sets whether the operating state of the multi-standby terminal 100 will be displayed through the first light emitter 10 and the second light emitter 20 and a menu screen which sets an emitting light color(s) of the light emitter for distinguishing between the master and slave setting state of the first SIM 41 and the second SIM 42 under the control of the first controller 10.

The first controller 110 can control overall operating status of the multi-standby terminal 100 and a signal flow between internal blocks of the multi-standby terminal 100. For example, the first controller 110 may comprise a main controller. Particularly, the first controller 110 according to the present invention can control the operating state of the first light emitter 10 and the second light emitter 20 so that user can intuitively recognize the operating state of the multi-standby terminal 100 through the light emitted by the first light emitter 10 and/or the second light emitter 20 to the exterior of the portable multi-standby terminal.

The first controller 110 can determine whether or not the first SIM 41 is installed through whether a communication channel with the first SIM 41 is formed, and can activate (ON) or deactivate (OFF) the first light emitter 10 based on the determination. In addition, the first controller 110 can receive information regarding whether or not the second SIM 42 is installed, which is transmitted through an intermediate communication processing unit 160, and can activate (ON) or deactivate (OFF) the second light emitter 20.

The first controller 110 can check the master/slave setting state of the first SIM 41 or the second SIM 42, and can control the brightness or color of light emitted by the first light emitter 10 and the second light emitter 20, which was explained above in detail, so the detailed explanation will be omitted here.

In case where an event is related with the first SIM 41, for example, a call request, a transmission and/or a reception of a text message or data occurs, the first controller 110 can control the first light emitter 10 to flicker for a preset amount of time according to a preset flickering cycle. In addition, in case where an event related with the second SIM 42, for example, a call request, a transmission and/or a reception of a text message or data occurs through the intermediate communication processing unit 160, the first controller 110 can control the second light emitter 20 to flicker for a preset amount of time according to a preset flickering cycle. When a charger insertion for charging a battery is sensed, the first controller 110 can control the first emitter 10 and the second emitter 20 to flicker at the same time.

The second controller 210 is an auxiliary controller of the multi-standby terminal 100, and can perform a function of calling with another terminal using the second wireless communication unit 250. Particularly, the second controller 210 according to the present invention can check information of whether the second SIM is installed, and can transmit the checked information to the first controller 110 through the intermediate communication processing unit 160. In addition, in case that an event is related with the second SIM 42, for example, a call request, a transmission and/or 1 reception of a text message or data through the second wireless communication unit 250 occurs, the second controller 210 can transmit the event to the first controller 110 through the intermediate communication processing unit 160.

The intermediate communication processing unit 160 typically comprises a medium which allows the first controller 110 and the second controller 210 that use different communication standards to transmit and receive data. A dual ported RAM (DPRAM) can be used as the intermediate communication processing unit 160. Particularly, in case an event related with the second SIM 42, for example, a call request or transmission and reception of a text message or data occurs, the intermediate communication processing unit 160 according to the present invention can transmit the event to the first controller 110, and can transmit information of whether the second SIM 42 is installed to the first controller 110 under the control of the second controller 210.

In addition, though not shown, the multi-standby terminal 100 can selectively further include elements having additional functions, such as a camera module for taking an image or video, a local area communication module for local area wireless communication, a broadcast receiving module for receiving a broadcast, and a digital sound source playing module like an MP3 module or the like. Such elements can be modified in various ways according to a convergence trend of digital devices, so not all such elements can be listed here, but the multi-standby terminal 100 according to the present invention can further include other elements which are similar to the above-mentioned elements.

Until now, the configuration of each element of the multi-standby terminal according to an exemplary embodiment of the present invention was explained. Hereinafter, a circuit for controlling a first light emitter and a second light emitter according to an exemplary embodiment of the present invention will be explained in accordance with FIGS. 3A and 3B.

Figure 3A:
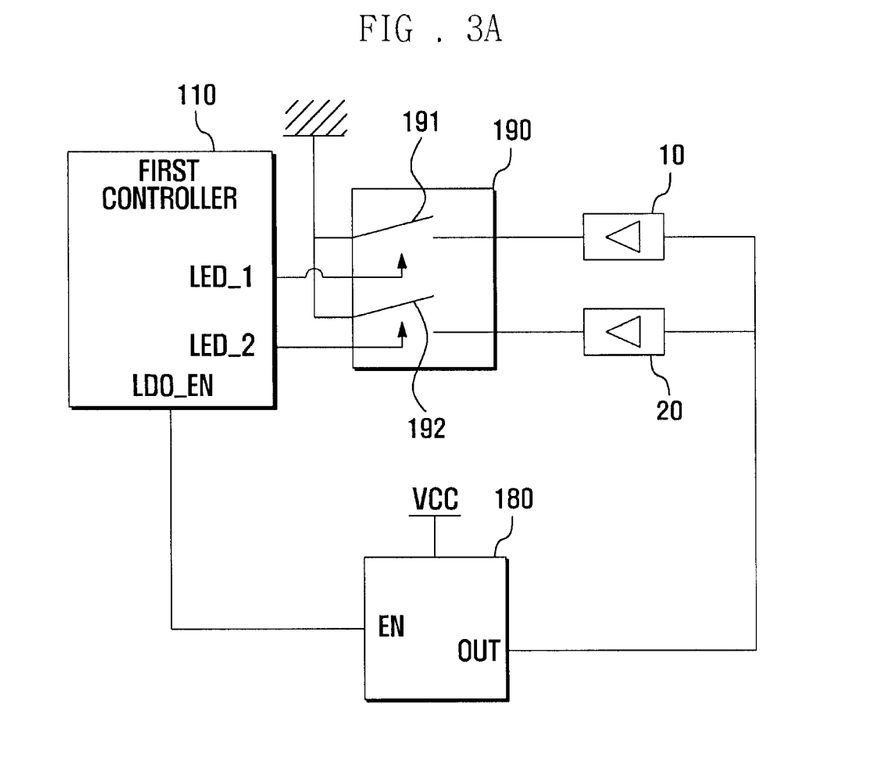
FIGS. 3A and 3B illustrate a control circuit which controls operating of a light emitter according to an exemplary embodiment of the present invention.

FIG. 3A illustrates a control circuit which controls operating of a first light emitter and a second light emitter according to an exemplary embodiment of the present invention.

Referring now to FIG. 3A, the control circuit according to the present invention can preferably include, for example, a first controller 110, a power supply unit 180, a switch unit 190, a first light emitter 10 and a second light emitter 20.

The power supply unit 180 can supply power to the first light emitter 10 and the second light emitter 20. Particularly, the power supply unit 180 according to an exemplary embodiment of the present invention may comprise a low drop output (LDO) which outputs constant voltage according to the control of the first controller 110. The LDO can include one output terminal (OUT) and one enable terminal (EN). That is, the power supply unit 180 can supply the same power to the first light emitter 10 and the second light emitter 20.

One side (+ terminal side) of the first light emitter 10 and the second light emitter 20 is connected to the output terminal (OUT) of the power supply unit 180, and the other side (− terminal side) is connected to the switch unit 190, so that light can be emitted according to the control of the first controller 110.

The switch unit 190 may comprise a dual-switch including a first switch 191 and a second switch 192. One side of the first switch 191 can be connected to the other side (− terminal side) of the first light emitter 10, and the other side of the first switch 191 can be grounded. The first switch 191 can be switched to connect or block a first path between the other side (− terminal side) of the first light emitter 10 and the ground under the control of the first controller 110. For example, in case the first switch 191 receives an activation signal (e.g., a high signal) transmitted from the first controller 110, the first switch 191 can form the first path, so that the first light emitter 10 can emit light. On the other hand, if the first switch 191 receives a deactivation signal (e.g., a low signal), the first switch 191 can block the first path, so that the first light emitter 10 can be deactivated (OFF).

One side of the second switch 192 can be connected to the other side (− terminal side) of the second light emitter 20, and the other side of the second switch 192 can be grounded. The second switch 192 can switch a second path between the other side (− terminal side) of the second light emitter 20 and the ground under the control of the first controller 110. For example, in case the second switch 192 receives an activation signal (e.g., a high signal) transmitted from the first controller 110, the second switch 192 can form a second path, so that the second light emitter 20 can emit light. On the other hand, in case the second switch 192 receives a deactivation signal (e.g., a low signal), the second switch 192 can block the second path, so that the second light emitter 20 can be deactivated (OFF).

The first controller 110 may preferably include a first terminal (LED_1) which controls activation or deactivation of the first light emitter 10, a second terminal (LED_2) which controls activation or deactivation of the second light emitter 20, and a third terminal (LDO_EN) which controls activation or deactivation of the power supply unit 180. The first terminal (LED_1), the second terminal (LED_2) and the third terminal (LDO_EN) can be a GPIO (General Purpose Input/Output) terminal.

The first terminal (LED_1) preferably comprises a terminal which is connected to a control terminal of a first switch 191 and transmits a signal for controlling activation/deactivation of the first switch 191 in order to control activation/deactivation of the first light emitter 10. The second terminal (LED_2) preferably comprises a terminal which is connected to a control terminal of a second switch 192, and transmits a signal for controlling activation/deactivation of the second switch 192 in order to control activation/deactivation of the second light emitter 20. The third terminal (LDO_EN) preferably comprises a terminal which is connected to an enable terminal (EN) of the power supply unit 180, and controls activation of the power supply unit 180.

Further, as shown in FIG. 3A, in case one LDO is used, the same power is supplied to the first light emitter 10 and the second light emitter 20, so that brightness of the first light emitter 10 and brightness of the second light emitter 20 cannot be controlled separately. Hence, hereinafter, a case where two LDOs are used will now be explained.

Figure 3B:
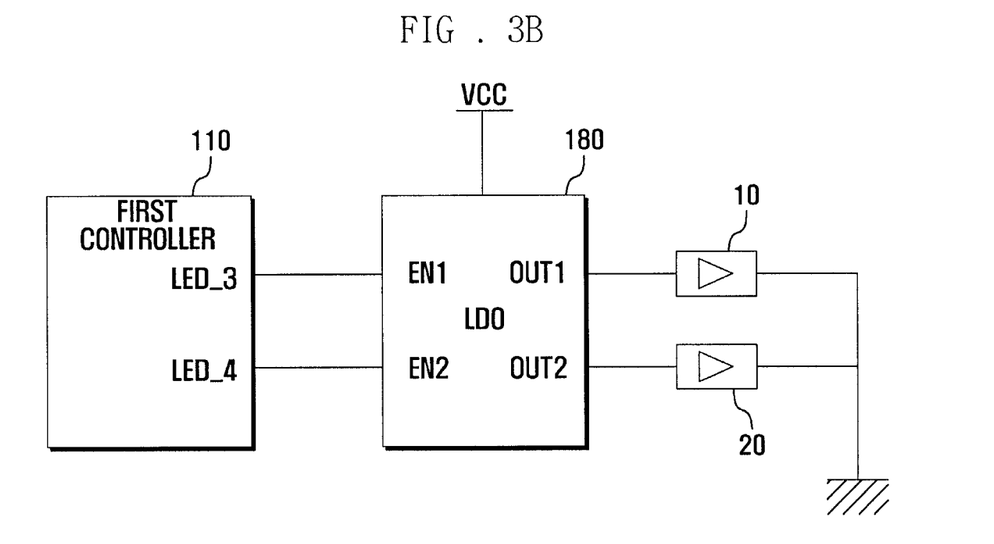

FIG. 3B illustrates a control circuit which controls operating of a first light emitter and a second light emitter according to another exemplary embodiment of the present invention.

Referring now to FIG. 3B, the control circuit according to another exemplary embodiment of the present invention may preferably include a first controller 110, a power supply unit 180, a first light emitter 10 and a second light emitter 20.

The power supply unit 180 preferably comprises a device which supplies power to the first light emitter 10 and the second light emitter 20. Particularly, the power supply unit 180 according to another exemplary embodiment of the present invention can be a dual LDO including a first output terminal (OUT1) for supplying power to the first light emitter 10 and a second output terminal (OUT2) for supplying power to the second light emitter 20.

With continued reference to FIG. 3B, a first output terminal (OUT1) of the first power supply unit 180 can be connected to one side (+ terminal side) of the first light emitter 10, and the other side (− terminal side) of the first light emitter 10 can be grounded. A second output terminal (OUT2) of the power supply unit 180 can be connected to one side (+ terminal side) of the second light emitter 20, and the other side (− terminal side) of the second light emitter 20 can be grounded.

The first controller 110 can include a fourth terminal (LED_3) which controls activation of the first light emitter 10 and a fifth terminal (LED_4) which controls activation of the second light emitter 20.

The fourth terminal (LED_3) can be connected to a first enable terminal (EN1) of the power supply unit 180. The fifth terminal (LED_4) can be connected to a second enable terminal (EN2) of the power supply terminal 180. For example, the first controller 110 can transmit a high signal to a first enable terminal (EN1) of the power supply unit 180 through the fourth terminal (LED_3) in order to activate the first light emitter 10. The power supply unit 180 which received the high signal can supply power to the first light emitter 10 through the first output terminal (OUT1), so that the first light emitter 10 can be activated. In addition, the first controller 110 can transmit a high signal to a second enable terminal (EN2) of the power supply unit 180 through the fifth terminal (LED_4) in order to activate the second light emitter 20. The power supply unit 180 which received the high signal can supply power to the second light emitter 20 through the second output terminal (OUT2), so that the second light emitter 20 can be activated.

Further, though not shown in FIGS. 3A and 3B, the multi-standby terminal 100 according to the present invention can further include a device for controlling brightness or emitting light color of the first light emitter 10 and the second light emitter 20. At this time, the first controller 110 can further include a control terminal for controlling brightness of the first light emitter 10 and the second light emitter 20. In more detail, the first controller 110 can further include a control terminal for controlling an output current or output voltage of the power supply unit 180 in order to control brightness of the first light emitter 10 and the second light emitter 20. For example, the first controller 110 can control brightness of the first light emitter 10 and brightness of the second light emitter 20 separately by controlling the output current of the first output terminal (OUT1) and the second output terminal (OUT2) of the power supply unit 180, respectively. In this case, it is desirable for the power supply unit 180 to be formed as a power supply device (e.g., an LDO) which can regulate the output current or voltage according to a control signal.

In addition, in case the first light emitter 10 and the second light emitter 20 comprise a color LED, the first controller 110 can further include a control terminal for regulating emitting light color. For example, in case the first light emitter 10 and the second light emitter 20 are a seven color LED which constituted R, G and B LEDs as one package, the first controller 110 can make the first light emitter 10 and the second light emitter 20 emit light of various colors by controlling brightness of the R, G and B LEDs.

Further, a control circuit shown in FIGS. 3A and 3B is merely an example, and the presently claimed invention is not limited to this example. That is, a person of ordinary skill in the art that the control circuit can be modified in various ways. For example, the output terminal of the power supply unit 180 can be connected with one side the first switch 191 and the second switch 192 by positioning the switch unit 190 behind the power supply unit 180, to connect the other side of the first switch 191 and the second switch 192 with one side (+ terminal side) of the first light emitter 10 and the second light emitter 20, respectively, and to ground the other side of the first light emitter 10 and the second light emitter 20. Thereafter, the first controller 110 can control the operation of the first light emitter 10 and the second light emitter 20 by controlling activation of the power supply unit 180, the first switch 191 and the second switch 192.

Until now, apparatus for displaying an operating state of a multi-standby terminal according to an exemplary embodiment of the present invention was explained. Hereinafter, a method of displaying operating state of a multi-standby terminal according to an exemplary embodiment of the present invention will be explained.

Figure 4:
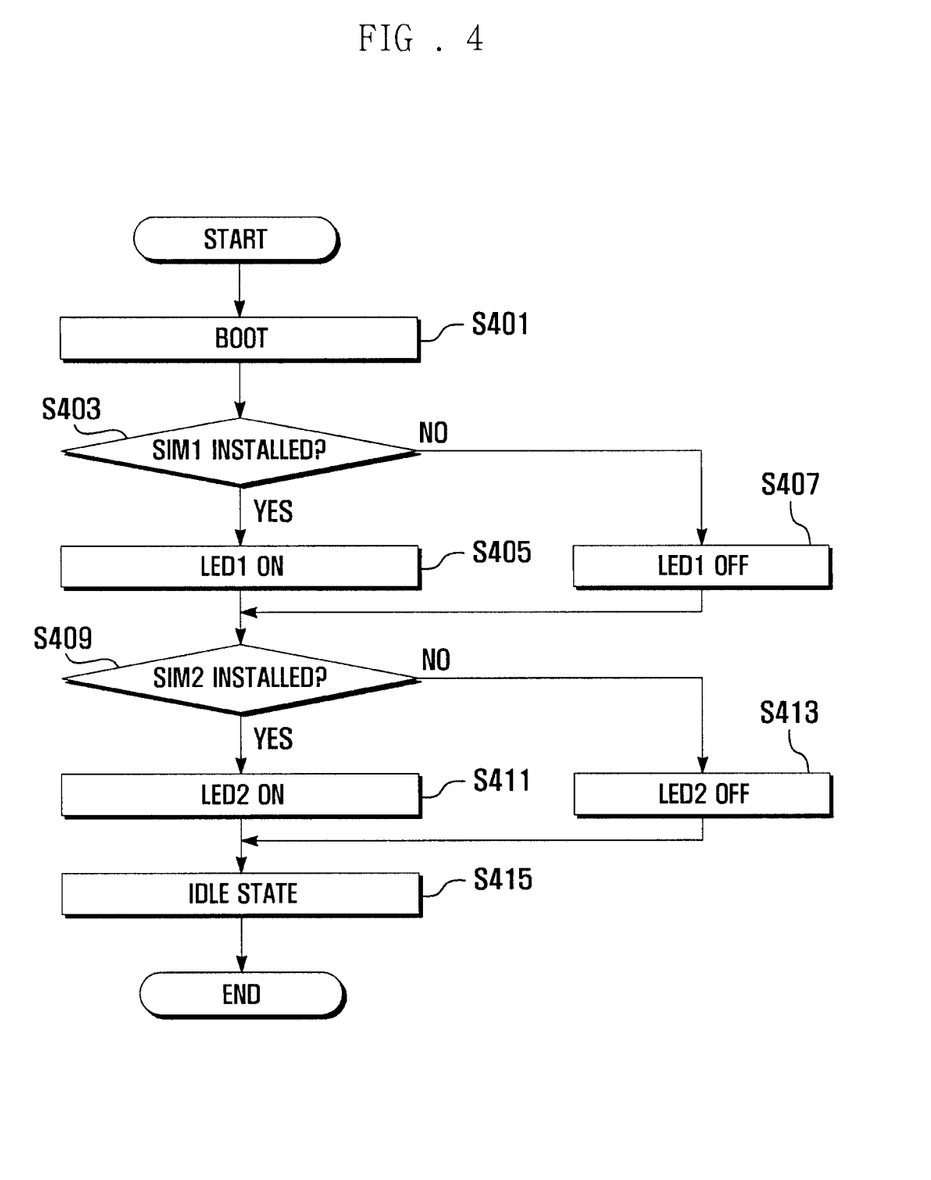
FIG. 4 is a flowchart illustrating a method of displaying whether a subscriber identification module is installed in a multi-standby terminal according to an exemplary embodiment of the present invention.

FIG. 4 is a flowchart illustrating a method of displaying whether or not a SIM is installed through a light emitter of a multi-standby terminal according to an exemplary embodiment of the present invention.

Referring now to FIGS. 2 and 4, at step (S401) the multi-standby terminal 100 is booted. Thereafter, at step (S403), the first controller 110 can check whether or not the first SIM 41 is installed in a first slot 140, which can be checked by whether a communication channel between the first SIM 41 and the first controller 110 is formed. Further, the multi-standby terminal 100 can further include a circuit which transmits an interrupt signal to the first controller 110 when the first SIM 41 is installed.

In a case where the first SIM 41 is installed in the first slot 140 at step 403, then at step (S405) first controller 110 can activate the first light emitter 10 "(ON)". Here, the first light emitter 10 may comprise a light emitting diode (LED). Particularly, the first light emitter 10 can be a color LED which emits light of two or more colors in case master/slave setting state of the SIM is indicated by emitting light color. On the other hand, in case the first SIM 41 was not installed in the first slot 140, at step (S407) the first controller 110 can deactivate the first light emitter 10 "(OFF)".

Thereafter, at step (S409), the second controller 210 can check whether or not the second SIM 42 is installed in the second slot 240. Determining whether the second SIM 42 is installed can be performed by determining whether a communication channel between the second controller 210 and the second SIM 42 was formed. In addition, the multi-standby terminal 100 can further include a circuit which transmits an interrupt signal to the second controller 210 when the second SIM 42 is installed.

In case the second SIM 42 is installed in the second slot 240 at step 409, at step (S411) the second controller 210 can transmit information that the second SIM 42 is installed in the second slot 240 to the first controller 110 through an intermediate communication processing unit 160, and the first controller 110 which received the information can activate (ON) the second light emitter 20. Here, the second light emitter 20 can be an LED, and in case master/slave setting state of the SIM is indicated by emitting light color of the light emitter, the second light emitter 20 can be a color LED which emits light of two or more colors.

On the other hand, in case the second SIM 42 was not installed in the second slot 240 at step 409, then at step (S413)

the second controller 210 can transmit information that the second SIM 42 was not installed in the second slot 240 to the first controller 110 through the intermediate communication processing unit 160, and the first controller 110 which received the information can deactivate (OFF) the second light emitter 20. In addition, if a signal that informs that the second SIM 42 is installed is not received, the first controller 110 can determine that the second SIM 42 was not installed, and deactivate (OFF) the second light emitter 20. Thereafter, the multi-standby terminal 100 can be in idle state (S415).

As described above, user can intuitively recognize whether the first SIM 41 and the second SIM 42 were installed through the first light emitter 10 and the second light emitter 20 exposed to the outside of the multi-standby terminal 100.

Further, while FIG. 4 illustrates that whether the first SIM 41 and the second SIM 42 were installed is checked during the booting process, but the presently claimed invention is not limited to this example. That is, whether the first SIM 41 and the second SIM 42 were installed can be checked in idle state after the booting is completed.

Figure 5:
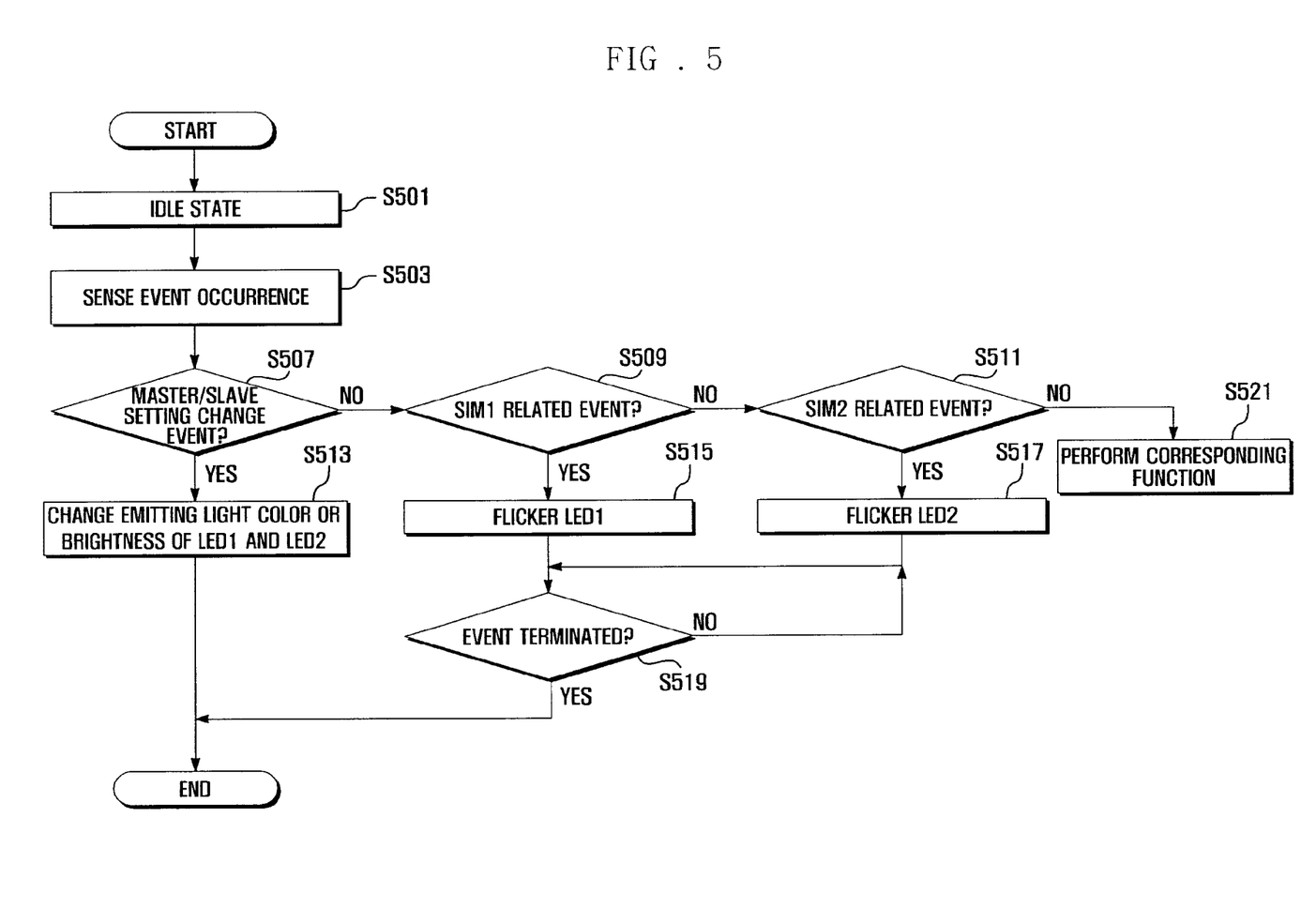
FIG. 5 is a flowchart illustrating a method of displaying operating state of a multi-standby terminal according to an exemplary embodiment of the present invention.

FIG. 5 is a flowchart illustrating a method of displaying the operating state of a multi-standby terminal according to an exemplary embodiment of the present invention.

Referring now to FIG. 5, at (S501) the first controller 110 can be in idle state. Thereafter, the first controller 110 can sense generation of an event (S503).

At step (S507), the first controller 110 can check whether or not the sensed event is a master/slave setting change event. In case the sensed event is the master/slave setting change event, at step (S513) the first controller 110 can change emitting light color of the first light emitter 10 and the second light emitter 20 according to the changed master/slave setting. For example, the first controller 110 can control a light emitter corresponding to a SIM which is set as master to emit light of a preset first color (e.g., green), and can control a light emitter corresponding to a SIM which is set as slave to emit light of a second color (e.g., red) which is visually distinguished from the first color. For example, in case user sets a first SIM 41 as master, the first controller 110 can make the first light emitter 10 emit light of the first color, and can make the second light emitter 20 emit light of the second color. To this end, the first light emitter 10 and the second emitter 20 according to the present invention can be formed as a color LED which emits light of two or more colors.

Further, in a case where the master/slave setting state of the SIM is distinguished by making brightness of the first light emitter 10 and brightness of the second light emitter 20 different, the first controller 110 can make a light emitter corresponding to a SIM which is set as master emit light with preset first brightness, for example, the maximum brightness of the light emitter, that is 100% brightness, and can make a light emitter corresponding to a SIM which is set as slave emit light with second brightness which is relatively darker than the first brightness, for example, 40% of the maximum brightness. Further, it was explained above that the first brightness is the maximum brightness (100%), but the presently claimed invention is not limited to this example. That is, the first brightness can be set as brightness (e.g., 80%) which is darker than the maximum brightness in consideration of power consumption. In addition, the second brightness can also be set in various ways according to designer's intention.

Further, with continued reference to FIG. 5, in a case where the event is not a master/slave setting change event at step 507, at step (S509) the first controller 110 can check whether the event is an event related with the first SIM 41.

In a case where the event is an event related with the first SIM 41 at step 509, at step (S515) the first controller 110 can control the first light emitter 10 to flicker for a preset amount of time according to a preset flickering cycle. The event related with the first SIM 41 can be a call request, or transmission and reception of a text message and data through the first wireless communication unit 150.

On the other hand, at step (S511), in a case where the event is not an event related with the first SIM 41 at step 509, the first controller 110 can check whether the event is an event related with the second SIM 42. Generation of an event related with the second SIM 42 can be transmitted from the second controller 210 through an intermediate communication processing unit 160.

In case the event is an event related with the second SIM 42 at step 511, at step (S517) the first controller 110 can control the second light emitter 20 to flicker for a preset amount of time according to a preset flickering cycle. The event related with the second SIM 42 can be a call request, a transmission and/or a reception of a text message and data through the second wireless communication unit 250.

On the other hand, in a case where the event is not an event related with the second SIM 42 at step 511, at step (S521) the first controller 110 can perform a corresponding function. For example, in case the event is a broadcast play event, the first controller 110 can play a broadcast. In addition, in case a charger is inserted for charging a battery, the first controller 110 can flicker the first light emitter 10 and the second light emitter 20 once at the same time. However, the presently claimed invention is not limited to this example. That is, the first controller 110 can control the first emitter 10 and the second emitter 20 to flicker several times at the same time when a charger is inserted.

Thereafter, at step (S519) it is checked whether the event was terminated, and if the event was terminated, the first controller 110 can terminate the method of displaying the operating state of the multi-standby terminal 100 according to the present invention. On the other hand, if the event was not terminated, the first light emitter 10 and the second light emitter 20 can keep flickering until the event is terminated.

As described above, according to the multi-standby terminal 100 of the present invention, user can intuitively recognize operating state of a multi-standby terminal, that is, recognize the SIM among a plurality of SIMs through which a call is requested or a text message or data are transmitted and received, and can intuitively recognize master/slave setting state of a SIM and whether a SIM is installed through a light emitter exposed to the outside, thereby improving user's convenience.

Further, a dual-standby terminal was used as an example in the above description, but the present invention is not limited to this example. For example, a multi-standby terminal according to the present invention can be a multi-standby terminal in which a standby with three or more same or different wireless communication networks at the same time is possible.

In addition, while the above explanation indicated that the operating state of a multi-standby terminal is displayed through two light emitters, the presently claimed invention is not limited to this example. For example, in other exemplary embodiments of the present invention, it is possible to display operating state of a multi-standby terminal using one color LED.

For example, the multi-standby terminal can flicker the color LED using the first color when the first SIM is installed, and can flicker the color LED using the second color when the second SIM is installed.

In addition, in a case where both the first SIM and the second SIM are installed, the multi-standby terminal can flicker the color LED using the first color and the second color by turns with a specific cycle (e.g., 1 second).

Moreover, the multi-standby terminal can flicker the color LED using the first color when an event related with the first SIM occurs, and can flicker the color LED using the second color when an event related with the second SIM occurs. The multi-standby terminal can also regulate brightness of the color LED in order to distinguish master/slave setting state of the SIM. For example, in a case where the first SIM is set as master, the multi-standby terminal can flicker the LED with the first brightness when the LED flickers using the first color, and can flicker the LED with the second brightness when the LED flickers using the second color. On the other hand, in a case where the second SIM is set as master, the multi-standby terminal can flicker the LED with the second brightness when the LED flickers using the first color, and can flicker the LED with the first brightness when the LED flickers using the second color.

In addition, it was explained above that the light emitter flickers as the light emitter is turned on/off, but the present invention is not limited to this example. That is, the light emitter can be gradually turned off, and can be gradually brightened when it flickers. The multi-standby terminal can further include a driver IC for controlling flickering operation of the light emitter in order to control a flickering display of the light emitter.

According to a method and apparatus for displaying the operating state of a multi-standby terminal according the above-described present invention, a user can intuitively recognize the operating state of a multi-standby terminal, for example, whether or not a SIM is installed, a master/slave setting state of a SIM, and a SIM related with an event such as a call request, a transmission and/or a reception of a text message and data among a plurality of SIMs, thereby improving user's convenience.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of displaying an operating state of a multi-standby terminal including a first subscriber identification module (SIM) and a second subscriber identification module (SIM), the method comprising:
   checking whether or not the first SIM and the second SIM are installed in the multi-standby terminal;
   activating (ON) or deactivating (OFF) a first light emitter according to whether the first SIM is installed, and activating (ON) or deactivating (OFF) a second light emitter according to whether the second SIM is installed;
   flickering the output of light by the first light emitter for a preset amount of time according to a preset flickering cycle when an event related with the first SIM occurs; and
   flickering the output of light by the second light emitter for a preset amount of time according to a preset flickering cycle when an event related with the second SIM occurs.

2. The method of claim 1, wherein the event related with the first SIM and the second SIM comprises at least one of a call request event, a text message transmission and/or a text reception event, or a data transmission and/or a data reception event.

3. The method of claim 1, further comprising:
   flickering the output of the first light emitter and the output of the second light emitter at the same time to indicate a charger for charging a battery is coupled to the multi-standby terminal.

4. The method of claim 1, further comprising:
   changing at least one of a brightness and a color of the output of the first light emitter and the output of the second light emitter according to a master/slave setting of the SIM when a master/slave setting change event of the SIM occurs.

5. The method of claim 4, wherein changing the color of the output of the first light emitter and the second light emitter comprises emitting light of a preset first color from the first light emitter corresponding to a SIM which is set as master, and emitting light of a second color which is visually distinguishable from the first color from the second light emitter corresponding to a SIM which is set as a slave.

6. The method of claim 4, wherein changing brightness of the first light emitter and the second light emitter comprises:
   emitting light with a preset first brightness from the first light emitter, and emitting light with a preset second brightness from the second light emitter which is distinguishable as being less bright than the first preset brightness in a case where the first SIM is set as master; and
   emitting light with the preset first brightness from the second light emitter, and emitting light with the preset second brightness from the first light emitter in a case where the second SIM is set as master.

7. The method according to claim 1, wherein checking whether or not the first SIM is installed in the multi-standby terminal is performed by determining whether a communication channel with the first SIM is formed, and activating (ON) or deactivating (OFF) the first light emitter based on the determination.

8. The method according to claim 1, wherein checking whether or not the second SIM is installed is determined by receiving a transmission through an intermediate communication processing unit, and activating (ON) or deactivating (OFF) the second light emitter 20 based on the determination.

9. The method according to claim 1, wherein the first SIM and the second SIM comprise a Code Division Multiple Access (CDMA) SIM and a Global System for Mobile communication (GSM), respectively.

10. The method according to claim 1, wherein the first SIM and the second SIM are associated with respectively different wireless communication protocols.

11. An apparatus for displaying an operating state of a multi-standby terminal including a first subscriber identification module (SIM) and a second subscriber identification module (SIM), the apparatus comprising:
   a first light emitter which is arranged to an exterior of the multi-standby terminal;
   a second light emitter which is separated from the first light emitter by a specific gap and is arranged to the exterior of the multi-standby terminal; and
   a first controller for controlling the first light emitter to activate (ON) or deactivate (OFF) according to whether the first SIM is installed and controlling the second light emitter to activate (ON) or deactivate (OFF) according to whether the second SIM is installed,
   wherein the first controller controls the first light emitter to flicker for a preset amount of time according to a preset flickering cycle when an event related with the first SIM occurs, and controls the second light emitter to flicker for a preset amount of time according to the preset flickering cycle when an event related with the second SIM occurs.

12. The apparatus of claim 11, further comprising:
a second controller that senses generation of an event related with the second SIM; and
an intermediate communication processing unit for processing communications between the first controller and the second controller, wherein the second controller transmits sensed information of the generation of the event to the first controller through said intermediate communication processing unit.

13. The apparatus of claim 12, wherein the event related with the first SIM and the second SIM includes at least one of a call request event, a text message transmission event, a text message reception event, a data transmission and a data reception event.

14. The apparatus of claim 11, wherein the first controller changes at least one of brightness and color emitted by at least one of the first light emitter and the second light emitter when a master/slave setting change event of a SIM occurs.

15. The apparatus of claim 14, wherein the first controller controls output of a particular one light emitter of the first light emitter and the second light emitter corresponding to a SIM which is set as master to emit light of a preset first color, and controls another particular one of the first light emitter and the second light emitter corresponding to a SIM which is set as slave to emit light of a second color that is visually distinguishable from the first color.

16. The apparatus of claim 14, wherein the first controller controls output of a particular one light emitter of the first light emitter and the second light emitter corresponding to a SIM which is set as master to emit light with a preset first brightness, and controls output of another particular one of the first light emitter and the second light emitter corresponding to a SIM which is set as slave to emit light with a second brightness which is less bright than the first brightness.

17. The apparatus of claim 11, wherein the first controller controls the first light emitter and the second light emitter to flicker at the same time when a charger for charging a battery is coupled thereto.

18. The apparatus of claim 11, wherein the first light emitter and the second light emitter are a color light emitting diode (LED) which emits light of at least two or more colors.

19. The apparatus of claim 11, further comprising:
a first storage unit which stores at least one of brightness and color emitted by the first light emitter and the second light emitter according to a master/slave setting.

20. The apparatus according to claim 11, wherein the first SIM and the second SIM are associated with respectively different wireless communication protocols.

* * * * *